United States Patent
Regev et al.

(10) Patent No.: US 10,805,300 B2
(45) Date of Patent: *Oct. 13, 2020

(54) COMPUTER NETWORK CROSS-BOUNDARY PROTECTION

(71) Applicant: INTERNATIONAL BUSINESS MACHINES CORPORATION, Armonk, NY (US)

(72) Inventors: Shmuel Regev, Tel-Aviv (IL); Amit Klein, Herzliya (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

This patent is subject to a terminal disclaimer.

(21) Appl. No.: 16/041,867

(22) Filed: Jul. 23, 2018

(65) Prior Publication Data

US 2018/0332044 A1 Nov. 15, 2018

Related U.S. Application Data

(63) Continuation of application No. 14/953,359, filed on Nov. 29, 2015, now Pat. No. 10,069,833.

(51) Int. Cl.
*H04L 29/06* (2006.01)
*H04L 29/08* (2006.01)

(52) U.S. Cl.
CPC ............ *H04L 63/10* (2013.01); *H04L 63/02* (2013.01); *H04L 63/107* (2013.01); *H04L 67/02* (2013.01); *H04L 67/06* (2013.01); *H04L 63/0272* (2013.01); *H04L 63/0428* (2013.01)

(58) Field of Classification Search
CPC ...................................... H04L 63/10
USPC .......................................... 714/799, 793, 798
See application file for complete search history.

(56) References Cited

U.S. PATENT DOCUMENTS

| | | | |
|---|---|---|---|
| 5,272,754 A | 12/1993 | Boerbert | |
| 5,557,559 A | 9/1996 | Rhodes | |
| 6,009,518 A | 12/1999 | Shiakallis | |
| 6,594,764 B1 | 7/2003 | Wishner et al. | |
| 6,850,252 B1 * | 2/2005 | Hoffberg | G06K 9/00369 348/E7.061 |
| 7,187,017 B2 * | 3/2007 | Sawase | H01L 27/1463 257/222 |
| 8,055,910 B2 | 11/2011 | Kocher et al. | |
| 8,360,313 B1 | 1/2013 | Leon et al. | |
| 8,949,709 B2 | 2/2015 | Wicker et al. | |
| 9,092,617 B2 | 7/2015 | Prashant et al. | |
| 2002/0010679 A1 * | 1/2002 | Felsher | G06F 19/328 705/51 |
| 2010/0241595 A1 * | 9/2010 | Felsher | G06F 19/328 705/400 |

(Continued)

OTHER PUBLICATIONS

List_of_Related_IBM_Applications, Jul. 23, 2018.

*Primary Examiner* — Fritz Alphonse
(74) *Attorney, Agent, or Firm* — Daniel J. Swirsky; AlphaPatent Associates Ltd.

(57) ABSTRACT

A computer security method including preventing access by a computer in a first computer network to a resource at a location within the first computer network responsive to the computer accessing a computer-readable document retrieved from a second computer network, wherein a reference to the resource is associated with the computer-readable document.

20 Claims, 3 Drawing Sheets

(56) References Cited

U.S. PATENT DOCUMENTS

2013/0268357 A1 10/2013 Heath
2014/0373136 A1 12/2014 Igelka et al.

* cited by examiner

COMPUTER NETWORK CROSS-BOUNDARY PROTECTION

BACKGROUND

Some computer networks, such as local area networks (LANs) or intranets, employ a lower level of security against malicious attacks when local computers within a computer network access documents and resources from within the same computer network than when they access documents and resources via external computer networks. This unfortunately makes such computer networks vulnerable to attack. For example, a computer user within a local computer network may unwittingly access a web page retrieved from an external computer network that attempts to exploit resources at networks addresses within the local computer network, leveraging the fact that default security settings, such as of IP addresses, port numbers, and credentials, are often left unchanged. These attacks can be used to spread malware, access sensitive information, and penetrate further into the attacked network.

SUMMARY

In one aspect of the invention a computer security method is provided, the method including detecting access, by a computer in a first computer network, to a computer-readable document, determining whether the computer-readable document was retrieved from a second computer network, identifying a reference, associated with the computer-readable document, to a resource at a location within the first computer network, and preventing access by the computer to the resource at the location within the first computer network responsive to determining that the computer-readable document was retrieved from the second computer network.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1:
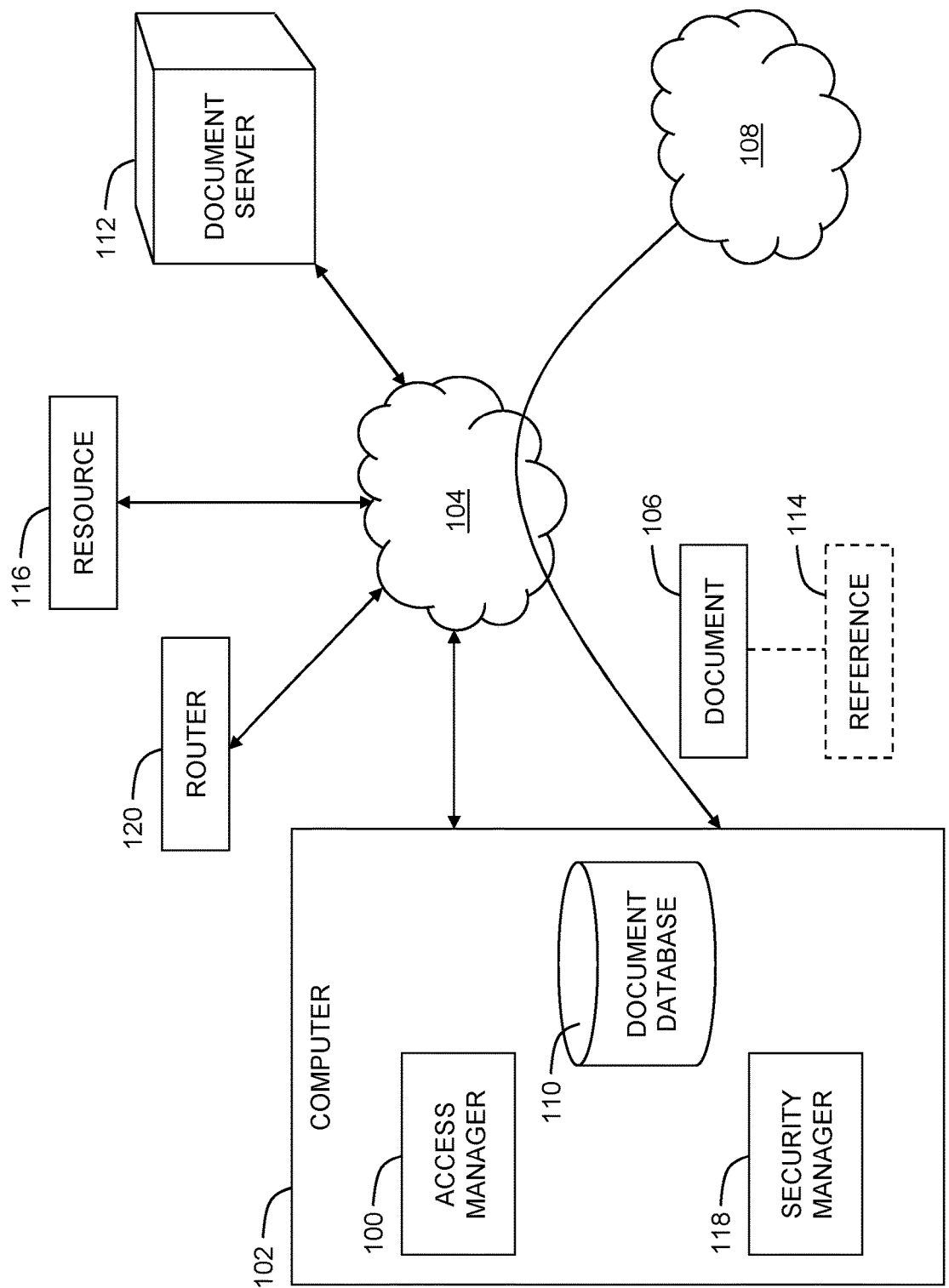
FIG. 1 is a simplified conceptual illustration of a computer security system, constructed and operative in accordance with an embodiment of the invention.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a simplified conceptual illustration of a computer security system constructed and operative in accordance with an embodiment of the invention. In the system of FIG. 1, an access manager 100 is configured to detect when a computer 102 within a computer network 104 accesses a computer-readable document 106, such as a web page or a cookie, where computer network 104 is defined as a collection of network addresses, such as of a local area network (LAN) or intranet, that are known to access manager 100 as belonging to computer network 104. Access manager 100 is also configured to determine whether computer-readable document 106 was retrieved from a computer network other than computer network 104, such as from a computer network 108, which may, for example, be the Internet. For example, access manager 100 is, in one embodiment, configured to recognize internet protocol (IP) network addresses that include the prefix 192.168. as belonging to computer network 104, and all other IP network addresses as belonging to computer networks other than computer network 104. Thus, if computer-readable document 106 was retrieved from a network address having a prefix other than 192.168., then computer-readable document 106 is determined to have been retrieved from a computer network other than computer network 104. Additionally or alternatively, a list of individual network addresses may be made known in advance to access manager 100 as belonging to computer network 104.

Access manager 100 preferably maintains an indicator indicating that a particular computer-readable document was retrieved by computer 102, or by any other computer in computer network 104, from a computer network other than computer network 104, such as by maintaining list of such computer-readable documents in a document database 110. Thus, if computer 102 accesses computer-readable document 106 from a location within computer network 104, such as from local data storage of computer 102 or a local document server 112 of computer network 104, and a listing of the document is found by access manager 100 in document database 110, then computer-readable document 106 is determined by access manager 100 to have been retrieved from a computer network other than computer network 104, despite the fact that it is currently accessed from a location within computer network 104.

Access manager 100 is also configured to identify a reference 114 that is associated with computer-readable document 106 and that refers to, or is otherwise associated with, a resource 116 that is found at a location within computer network 104. Reference 114 may, for example, be an IP network address or Uniform Resource Locator (URL) located within computer-readable document 106 or within data found at a network location referred to by computer-readable document 106. Resource 116 may, for example, be a browser cookie stored on local data storage of computer 102, a web page stored on local document server 112, or an administrator web page of a router 120 of computer network 104. Reference 114 may be configured for use with any known protocol for accessing resource 116, such as HTTP, FTP, or any other file or resource access protocol.

Also shown in FIG. 1 is a security manager 118 configured to prevent access by computer 102 to resource 116 at its location within computer network 104 when it is determined by access manager 100 that computer-readable document 106 was retrieved from a computer network other than computer network 104 as described hereinabove. For example, security manager 118 may shut down a communications socket between a web browser on computer 102 that accessed computer-readable document 106 and that is attempting to access resource 116, may prevent such a communications socket from being opened, or may simply close the browser tab that is attempting to access resource 116. Security manager 118 is additionally or alternatively configured to delete computer-readable document 106 from computer network 104, and preferably any other computer-readable documents related to computer-readable document 106, such as cookies, when it is determined by access manager 100 that computer-readable document 106 was retrieved from a computer network other than computer network 104 as described hereinabove. Security manager 118 is additionally or alternatively configured to prevent operation of resource 116, such as until a system administrator intervenes, in order to allow security measures relating to resource 116 and/or computer network 104 to be considered in light of the identified security vulnerability. Security manager 118 is optionally configured to provide a notification, such as to a system administrator of computer 102 and/or computer network 104, identifying computer-readable document 106, its network address or URL at the computer network from which it was originally retrieved, and resource 116.

Any of the elements shown in FIG. 1 are preferably implemented by a computer, such as by computer 102 or another computer (not shown), in computer hardware and/or in computer software embodied in a non-transitory, computer-readable medium in accordance with conventional techniques.

Figure 2:
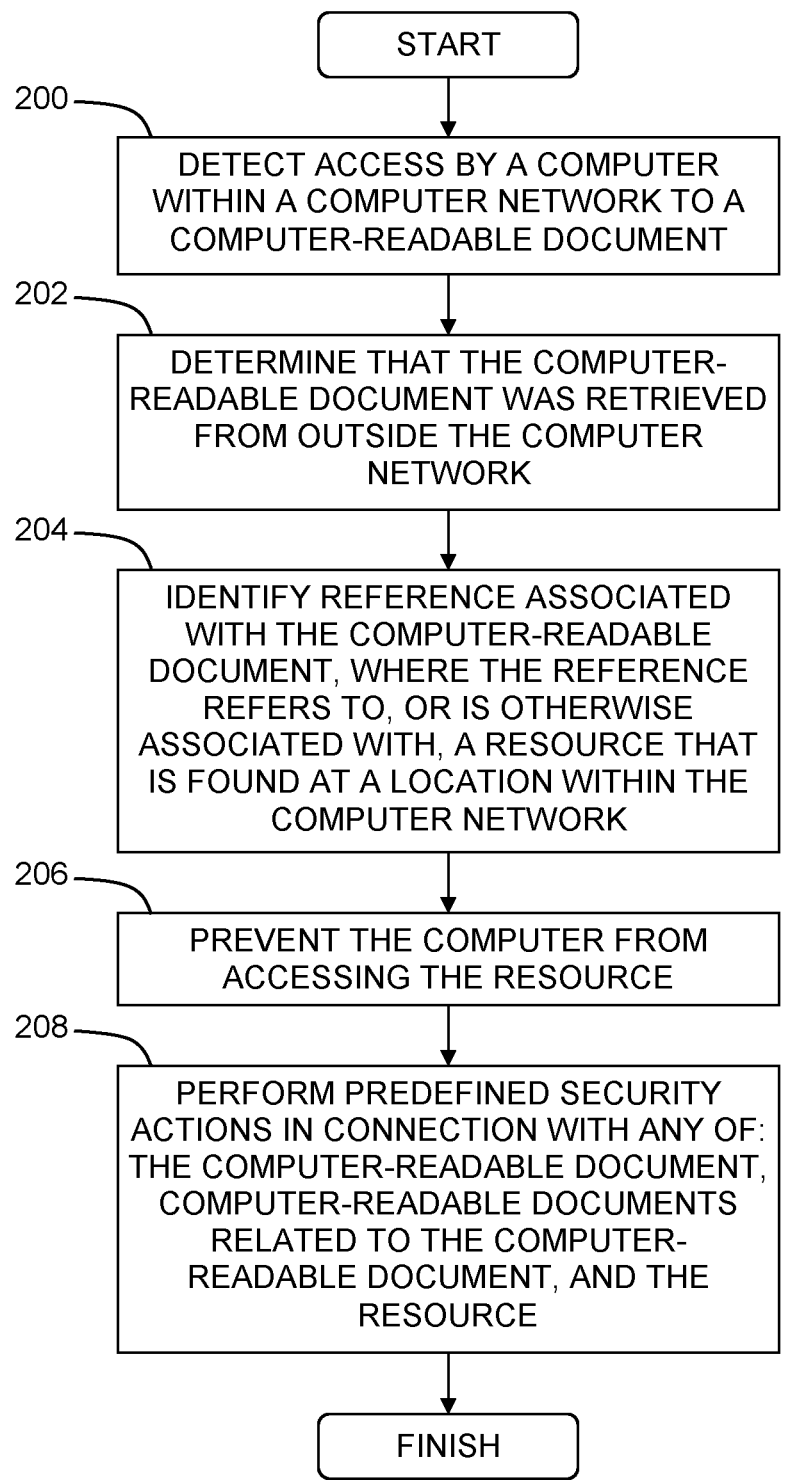
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, detection is made when a computer within a computer network accesses a computer-readable document, such as a web page, (step 200), whereupon it is determined that the computer-readable document was retrieved from a location outside of the computer network (step 202). A reference associated with the computer-readable document is identified, where the reference refers to, or is otherwise associated with, a resource that is found at a location within the computer network (step 204), whereupon the computer is prevented from accessing the resource at its location within the computer network (step 206). Predefined security actions are optionally performed in connection with any of the computer-readable document, computer-readable documents related to the computer-readable document, and the resource (step 208), such as deleting the computer-readable documents from the computer network, preventing operation of the resource, and providing a notification regarding any of the computer-readable documents and the resource.

Figure 3:
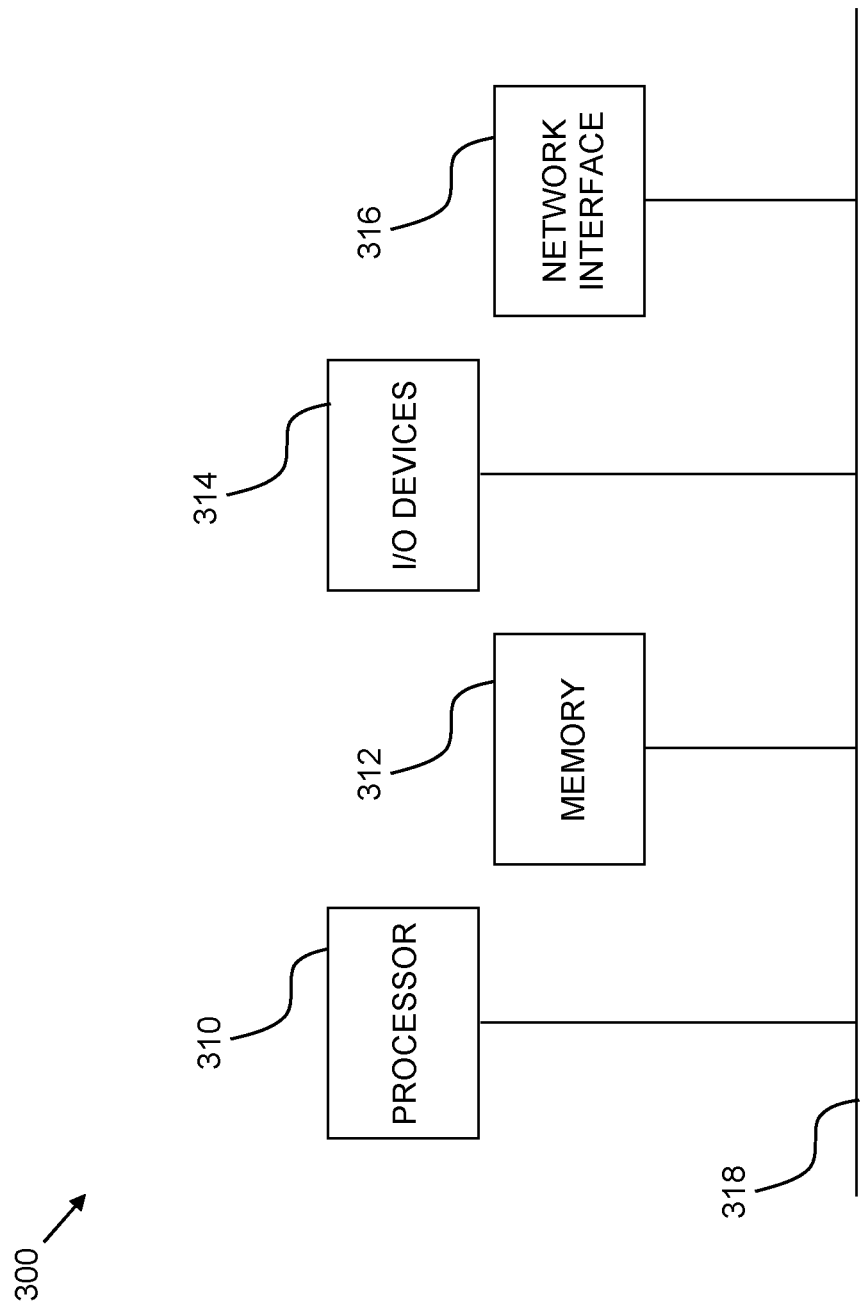
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Applicant hereby rescinds all limitations or disclaimers that may have been expressed or implied by applicant's remarks or applicant's amendments of the claims in all other patent applications, including the parent application (US patent application Ser. No. 14/953,359). Applicant respectfully requests that the Examiner examine the claims presented in this continuing application solely on their merits and independent of said limitations and disclaimers. Applicant respectfully requests that the Examiner revisit all prior art, including references cited against any claims in the other patent applications.

What is claimed is:

1. A computer security method comprising:
preventing access by a computer in a first computer network to a resource at a location within the first computer network,
wherein the preventing is performed responsive to the computer accessing a computer-readable document retrieved from a second computer network, and
wherein a reference to the resource is associated with the computer-readable document.

2. The method according to claim 1 and further comprising identifying the reference within the computer-readable document.

3. The method according to claim 1 and further comprising maintaining an indicator indicating that the computer-readable document was retrieved from the second computer network, wherein the computer-readable document is stored in a data storage device after being retrieved from the second computer network, and wherein the computer-readable document is retrieved by the computer from the data storage device.

4. The method according to claim 1 wherein the preventing comprises preventing wherein the computer-readable document is a web page.

5. The method according to claim 1 wherein the preventing comprises preventing operation of the resource.

6. The method according to claim 1 and further comprising deleting the computer-readable document from a data storage device of the computer.

7. The method according to claim 1 and further comprising deleting from a data storage device of the computer a second computer-readable document that is referred to by the computer-readable document that was retrieved from the second computer network.

8. A computer security system configured to prevent access by a computer in a first computer network to a resource at a location within the first computer network responsive to the computer accessing a computer-readable document retrieved from a second computer network, wherein a reference to the resource is associated with the computer-readable document.

9. The system according to claim 8 wherein the reference is within the computer-readable document.

10. The system according to claim 8 wherein the computer security system is configured to maintain an indicator indicating that the computer-readable document was retrieved from the second computer network, wherein the computer-readable document is stored in a data storage device after being retrieved from the second computer network, and wherein the computer-readable document is retrieved by the computer from the data storage device.

11. The system according to claim 8 wherein the computer-readable document is a web page.

12. The system according to claim 8 wherein the computer security system is configured to prevent operation of the resource.

13. The system according to claim 8 wherein the computer security system is configured to delete the computer-readable document from the first computer network.

14. The system according to claim 8 wherein the computer security system is configured to delete from a data storage device of the computer a second computer-readable document that is referred to by the computer-readable document that was retrieved from the second computer network.

15. A computer program product for providing computer security, the computer program product comprising:
a non-transitory, computer-readable storage medium; and
computer-readable program code embodied in the storage medium, wherein the computer-readable program code is configured to prevent access by a computer in a first computer network to a resource at a location within the first computer network responsive to the computer accessing a computer-readable document retrieved from a second computer network, wherein a reference to the resource is associated with the computer-readable document.

16. The computer program product according to claim 15 wherein the computer-readable program code is configured to identify the reference within the computer-readable document.

17. The computer program product according to claim 15 wherein the computer-readable program code is configured to maintain an indicator indicating that the computer-readable document was retrieved from the second computer network, wherein the computer-readable document is stored in a data storage device after being retrieved from the second computer network, and wherein the computer-readable document is retrieved by the computer from the data storage device.

18. The computer program product according to claim 15 wherein the computer-readable program code is configured to prevent operation of the resource.

19. The computer program product according to claim 15 wherein the computer-readable program code is configured to delete the computer-readable document from the first computer network.

20. The computer program product according to claim 15 wherein the computer-readable program code is configured to delete from a data storage device of the computer a second computer-readable document that is referred to by the computer-readable document that was retrieved from the second computer network.

* * * * *